United States Patent
Sakamoto et al.

(10) Patent No.: US 12,253,044 B2
(45) Date of Patent: Mar. 18, 2025

(54) CONTROL APPARATUS OF MOTOR GENERATOR, AND POWER GENERATION APPARATUS AND MOVING BODY COMPRISING SAME

(71) Applicant: DENSO CORPORATION, Kariya (JP)

(72) Inventors: Akira Sakamoto, Kariya (JP); Keisuke Kawai, Kariya (JP); Yuichi Handa, Kariya (JP); Syuya Kamizono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/226,551

(22) Filed: Jul. 26, 2023

(65) Prior Publication Data

US 2023/0366361 A1   Nov. 16, 2023

Related U.S. Application Data

(63) Continuation of application No. PCT/JP2022/007878, filed on Feb. 25, 2022.

(30) Foreign Application Priority Data

Mar. 16, 2021 (JP) ................. 2021-042791

(51) Int. Cl.
  *F02D 45/00* (2006.01)
  *H02P 9/04* (2006.01)
  *H02P 101/45* (2016.01)

(52) U.S. Cl.
  CPC ............... *F02D 45/00* (2013.01); *H02P 9/04* (2013.01); *F02D 2200/1004* (2013.01); *F02D 2250/22* (2013.01); *F02D 2250/24* (2013.01); *H02P 2101/45* (2015.01)

(58) Field of Classification Search
  CPC ............ F02D 45/00; F02D 2200/1004; F02D 2250/22; F02D 2250/24; F02D 29/06; H02P 2101/45; H02P 9/04
  See application file for complete search history.

(56) References Cited

U.S. PATENT DOCUMENTS

2009/0145381 A1* 6/2009 Watanabe ............... F01L 1/267
                                                        123/192.1
2016/0375894 A1   12/2016 Kawai et al.

FOREIGN PATENT DOCUMENTS

| JP | H11-22481 A | 1/1999 |
| JP | 2002-180863 A | 6/2002 |
| JP | 2002-364407 A | 12/2002 |

* cited by examiner

*Primary Examiner* — Sean Gugger
(74) *Attorney, Agent, or Firm* — Oliff PLC

(57) ABSTRACT

A control apparatus for a motor generator that is connected to an internal combustion engine. The control apparatus estimates an estimated torque pulsation that is an estimation value of torque pulsation of the internal combustion engine. The control apparatus controls the motor generator to reduce generated power and suppress decrease in a rotation speed of the internal combustion engine, when a negative torque that obstructs rotation of the internal combustion engine is generated in the estimated torque pulsation of the internal combustion engine.

12 Claims, 7 Drawing Sheets

CONTROL APPARATUS OF MOTOR GENERATOR, AND POWER GENERATION APPARATUS AND MOVING BODY COMPRISING SAME

CROSS-REFERENCE TO RELATED APPLICATION

The present application is a continuation application of International Application No. PCT/JP2022/007878, filed on Feb. 25, 2022, which claims priority to Japanese Patent Application No. 2021-042791, filed on Mar. 16, 2021. The contents of these applications are incorporated herein by reference in their entirety.

BACKGROUND

The present disclosure relates to a control apparatus that controls a motor generator that is connected to an internal combustion engine of a vehicle or the like, and a power generation apparatus and a moving body that include the control apparatus. The motor generator that is connected to be capable of reciprocally transmitting torque between the motor generator and an output shaft of an internal combustion engine is known.

SUMMARY

An aspect of the present disclosure provides a control apparatus of a motor generator that is connected to an internal combustion engine. The control apparatus estimates an estimated torque pulsation that is an estimation value of torque pulsation of the internal combustion engine. The control apparatus controls the motor generator to reduce generated power and suppress decrease in a rotation speed of the internal combustion engine, when a negative torque that obstructs rotation of the internal combustion engine is generated in the estimated torque pulsation of the internal combustion engine.

DESCRIPTION OF THE EMBODIMENTS

Figure 1:
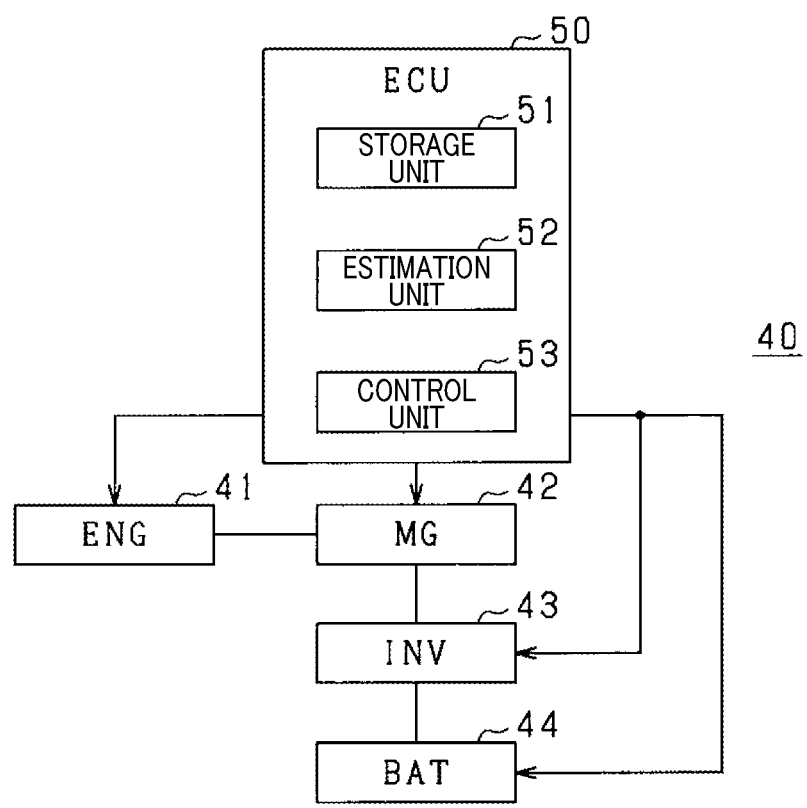
FIG. 1 is a schematic diagram illustrating a vehicle system in which a motor generator according to an embodiment is mounted.

JP 5142374 B2 describes a technology in which, in a motor generator that is connected to be capable of reciprocally transmitting torque between the motor generator and an output shaft of an internal combustion engine, during a period in which a torque (negative torque) in a direction that obstructs rotation of the internal combustion engine is generated in the internal combustion engine, torque pulsation in the internal combustion engine is mitigated by the motor generator being operated as a motor and performing a drive assist operation for the internal combustion engine. As a result of the torque pulsation in the internal combustion engine being mitigated, the internal combustion engine is damped.

When the drive assist operation by the motor generator is performed to reduce the torque pulsation in the internal combustion engine as in JP 5142374 B2, power generated by the motor generator is consumed by the drive assist operation. Therefore, decrease in power generation efficiency is a concern. To improve the power generation efficiency of the motor generator, execution of the drive assist operation is preferably suppressed.

It is thus desired to provide a technology for suppressing decrease in power generation efficiency in a motor generator that may occur to mitigate torque pulsation in an internal combustion engine.

An exemplary embodiment of the present disclosure provides a control apparatus of a motor generator that is connected to an internal combustion engine. The control apparatus includes: an estimation unit that estimates an estimated torque pulsation that is an estimation value of torque pulsation of the internal combustion engine; and a control unit that controls the motor generator to reduce generated power and suppress decrease in a rotation speed of the internal combustion engine, when a negative torque that obstructs rotation of the internal combustion engine is generated in the estimated torque pulsation of the internal combustion engine.

As a result of the control apparatus of the present exemplary embodiment, the control unit controls the motor generator to reduce the generated power and suppress decrease in the rotation speed of the internal combustion engine, when a negative torque is generated in the estimated torque pulsation of the internal combustion engine estimated by the estimation unit. Here, reducing the generated power includes a power generation operation being performed with a power generation amount being reduced and power generation being stopped.

In either case, decrease in the rotation speed of the internal combustion engine is suppressed and contribution is made to mitigation of the torque pulsation in the internal combustion engine. When the negative torque is generated in the estimated torque pulsation of the internal combustion engine, the torque pulsation in the internal combustion engine can be mitigated by the power generation amount being reduced, without a drive assist operation that may reduce power generation efficiency in the motor generator being performed at all times.

Consequently, decrease in power generation efficiency in the motor generator that may occur to mitigate the torque pulsation in the internal combustion engine can be suppressed. Furthermore, the present disclosure can also be provided as a power generation apparatus or a moving body that includes an internal combustion engine, a motor generator, and the above-described control apparatus of a motor generator.

The present disclosure will be further clarified through the detailed description herebelow, with reference to the accompanying drawings.

EMBODIMENTS

FIG. 1 shows an example of an onboard system 40 to which a control apparatus of a motor generator according to a first embodiment is applied. The onboard system 40 includes an engine (ENG) 41, a motor generator (MG) 42, an inverter (INV) 43, a secondary battery (BAT) 44, and a control apparatus (ECU) 50. For example, the engine 41 may be a four-cycle engine that is driven in four strokes that are intake, compression, expansion, and exhaust.

Figure 2:
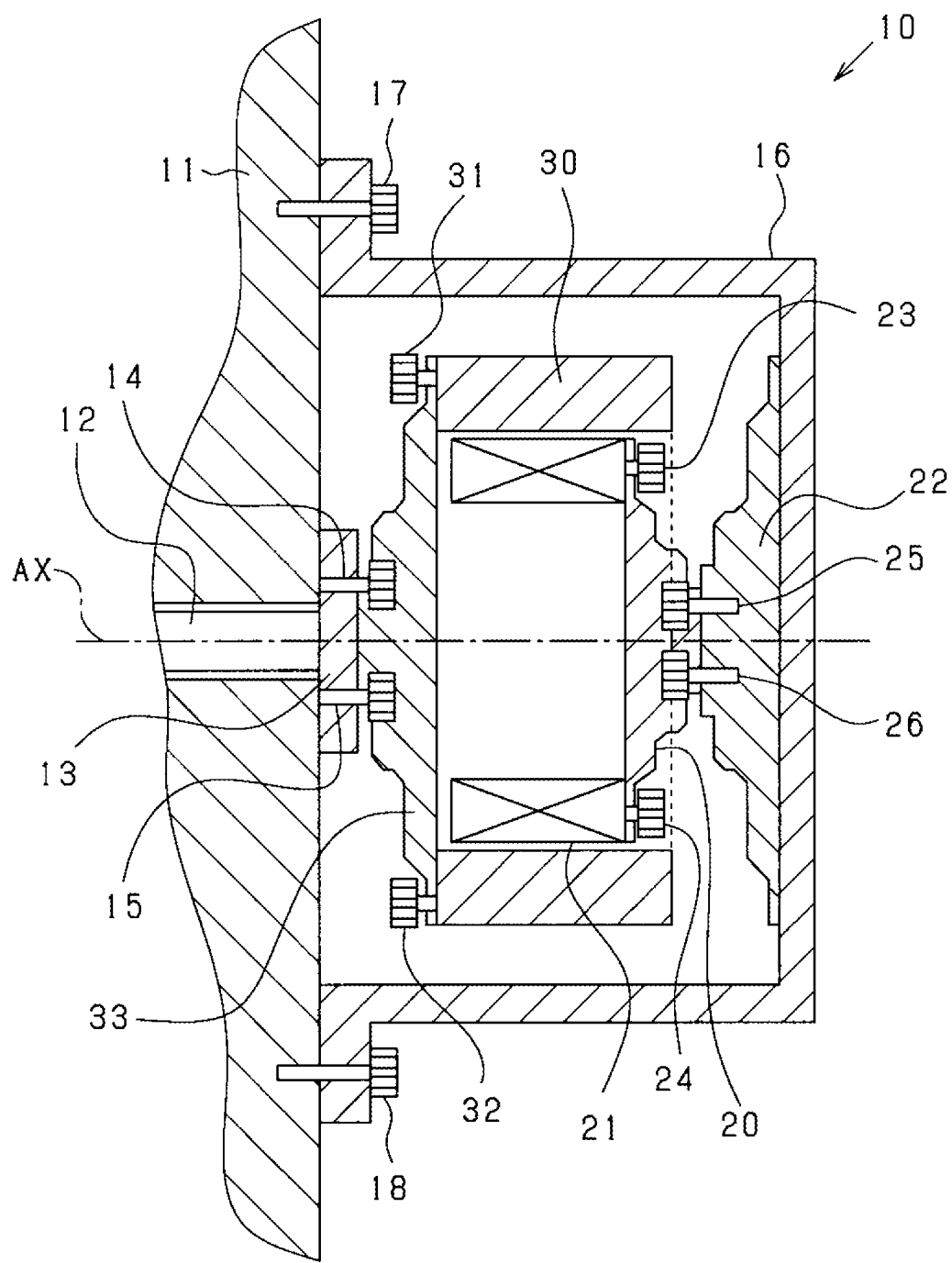
FIG. 2 is a cross-sectional view of the motor generator according to the embodiment.

FIG. 2 shows an example of a motor generator used as the motor generator 42. As shown in FIG. 2, a motor generator 10 is fixed to a wall surface 11 of an engine block of an internal combustion engine (engine) of a vehicle by a housing 16. The motor generator 10 is also attached to a shaft 12. The motor generator 10 interlocks with the internal combustion engine of a vehicle or the like by being connected to the internal combustion engine.

The motor generator 10 includes a stator 20, a stator support 22, a rotor 30, and a rotor support 33. The housing 16 is fixed to the wall surface 11 of the engine block by fastening of bolts 17 and 18. The motor generator 10 is housed in a space that is surrounded by the wall surface 11 and the housing 16. The stator support 22 is fixed to a surface that is an inner wall surface of the housing 16 opposing the wall surface 11. The stator 20 is fixed to the stator support 22 by fastening of bolts 25 and 26.

The shaft 12 is a rotating shaft that rotates around an axis AX. The shaft 12 is a crank shaft of the internal combustion engine or a shaft that interlocks with the crank shaft. The shaft 12 passes through the wall surface 11 and is fixed to an end portion 13 arranged inside the housing 16. The rotor support 33 is rigidly coupled with the end portion 13 by fastening of bolts 14 and 15, and fixed. The rotor 30 is rigidly coupled with the rotor support 33 by fastening of bolts 31 and 32, and fixed. Here, rigid coupling refers to mutual coupling so as to be integrated similarly to a single rigid body. The shaft 12 and the rotor 30 are fixed by being mutually rigidly coupled with the rotor support 33 therebetween, and the rotor 30 rotates with the shaft 12 in an interlocking manner. As a result of the shaft 12 and the rotor 30 being mutually rigidly coupled, rattling between components can be suppressed and noise (rattling sounds) attributed to rattling can be suppressed.

The stator 20 is arranged inside the rotor 30. The axis AX is also a center axis of the stator 20. The stator 20 and the rotor 30 are in an annular shape around the axis AX. The motor generator 10 is a rotating electric machine with the axis AX as the center. The motor generator 10 is a permanent-magnet-type motor generator. The stator 20 is provided with a coil 21. A permanent magnet (not shown) is provided on a surface of or inside the rotor 30. The motor generator 10 functions as a motor (more specifically, a permanent magnet [PM] motor) that rotatably drives the shaft 12 by rotating the rotor 30, as a result of the coil 21 being energized. In addition, the motor generator 10 functions as a power generator by the shaft 12 rotatably driving the rotor 30 and the coil 21 generating an induction current.

Here, the permanent-magnet-type motor generator is described as an example of the motor generator 10. However, the motor generator 10 is not limited thereto and may be an induction type.

As shown in FIG. 2, the engine 41 and the motor generator 42 are connected such that the shaft 12 and the rotor 30 are fixed to each other and interlocked. During a combustion stroke of the engine 41, a combustion torque is transmitted to the crank shaft of the engine 41, and the rotor 30 can be rotatably driven by the shaft 12. As a result of torque variation transmitted to the rotor 30 through the shaft 12, an induction current is generated and power can be generated. Here, a torque that is generated in the four strokes of the engine 41 changes as a result of inertial force of the reciprocating mass of a piston, loss during intake and exhaust, and the like. Here, as shown in FIG. 2, the engine 41 and the motor generator 42 are such that the shaft 12 and the rotor 30 are connected to each other without a flywheel, a gear, or a damper therebetween.

The inverter 43 provides a function for converting power supplied from the secondary battery 44 from a direct current to an alternating current, and supplying the alternating-current power to the motor generator 42. In addition, the inverter 43 also provides a function for converting power generated by the motor generator 42 from an alternating current to a direct current, and supplying the direct-current power to the secondary battery 44.

The ECU 50 is a control apparatus that controls the engine 41, the motor generator 42, the inverter 43, and the secondary battery 44. The ECU 50 includes a microcomputer that is configured by a central processing unit (CPU) and various memories. The motor generator 42 is a motor generator that is connected to the engine 41 that is an internal combustion engine. The ECU 50 provides a function as a control apparatus that controls the motor generator 42 that is the motor generator.

The ECU 50 includes a storage unit 51, an estimation unit 52, and a control unit 53. The storage unit 51 stores therein torque pulsation that indicates changes in a torque Te relative to a crank angle CA of the engine 41 as torque pulsation information, in association with a rotation speed Ng and a torque Tg of the motor generator 42. As the torque pulsation information, the torque pulsation that indicates a relationship between the crank angle CA and the torque Te of the engine 41 is stored for each parameter combination, in a state in which the rotation speed Ng and the torque Tg of the motor generator 42 are mapped as parameters. As a result of the mapped torque pulsation information being read based on the rotation speed Ng and the torque Tg, the torque pulsation of the engine 41 can be estimated.

The estimation unit 52 estimates an estimated torque pulsation that is an estimation value of the torque pulsation of the engine 41. More specifically, the estimation unit 52 reads the torque pulsation of the engine 41 based on a power generation torque command Tgc and a target rotation speed Ngr of the motor generator 42 from a map of the torque pulsation information stored by the storage unit 51. Then, the torque pulsation of the engine 41 that is read is estimated as the estimation value of the torque pulsation of the engine 41. Here, in the present specifications, the estimation value of the torque pulsation of the engine 41 may be referred to the estimated torque pulsation. In addition, regarding the torque of the engine 41, a torque in a rotation direction of the engine 41 is referred to as a positive torque and a torque in a direction obstructing rotation is referred to as a negative torque. The positive torque and the negative torque are torques in directions opposite each other.

The control unit 53 performs drive control of the motor generator 42 based on the estimated torque pulsation estimated by the estimation unit 52. The control unit 53 drives the motor generator 42 as a power generator during a section of the estimated torque pulsation in which a torque value is estimated to be a positive torque or zero. Meanwhile, the control unit 53 controls the motor generator 42 to suppress decrease in the rotation speed of the engine 41 by reducing generated power during a section of the estimated torque pulsation in which the torque value is estimated to be a negative torque. More specifically, the control unit 53 selectively performs any of reducing the generated power and driving the motor generator 42 as a power generator, stopping driving of the motor generator 42, and driving the motor generator 42 as a motor. As a result, the control unit 53 reduces the generated power of the motor generator 42 and suppresses decrease in the rotation speed of the engine 41.

As operation content for reducing the generated power, the control unit 53 selects any of a power generation operation at a low power generation amount, stopping of operation, and a drive assist operation that assists in driving of the engine 41 by the motor generator 42 being driven as the motor, based on a state of each configuration included in the onboard system 40. The control unit 53 controls the motor generator 42 based on the selected operation content. As a result of the generated power being reduced, the drive assist operation enables the negative torque to be more effectively mitigated by the motor generator 42 being driven as a motor upon power generation being stopped. However, decrease in the power generation efficiency of the motor generator 42 is a concern.

For example, the control unit 53 may be configured to select the operation content based on a magnitude of rotation variation in the engine 41. Specifically, for example, the torque pulsation may be estimated to be great when the rotation variation in the engine 41 is great, and thus, the control unit 53 prioritizes mitigation of the negative torque in the engine 41 and effectively suppresses decrease in the rotation speed of the engine 41 by the drive assist operation. Meanwhile, the torque pulsation is estimated to be small when the rotation variation in the engine 41 is small, and thus, the control unit 53 prioritizes the power generation efficiency of the motor generator 42. The control unit 53 suppresses decrease in the rotation speed of the engine 41 by the power generation operation at a low power generation amount or by stopping operation, and does not perform the drive assist operation.

For example, the control unit 53 may be configured to perform the drive assist operation when the rotation variation of the engine 41 is equal to or greater than a predetermined threshold. For example, the predetermined threshold can be set based on a relationship between the rotation variation and the torque pulsation of the engine 41 that is determined in advance by an experiment or simulation. Furthermore, the control unit 53 may be configured to change a drive assist amount of the motor generator 42 based on changes in torque in the engine 41 during the drive assist operation. Moreover, the control unit 53 may be configured to control the motor generator 42 with the power generation torque command as a fixed value during the power generation operation in which the motor generator 42 is driven as the power generator.

Figure 3:
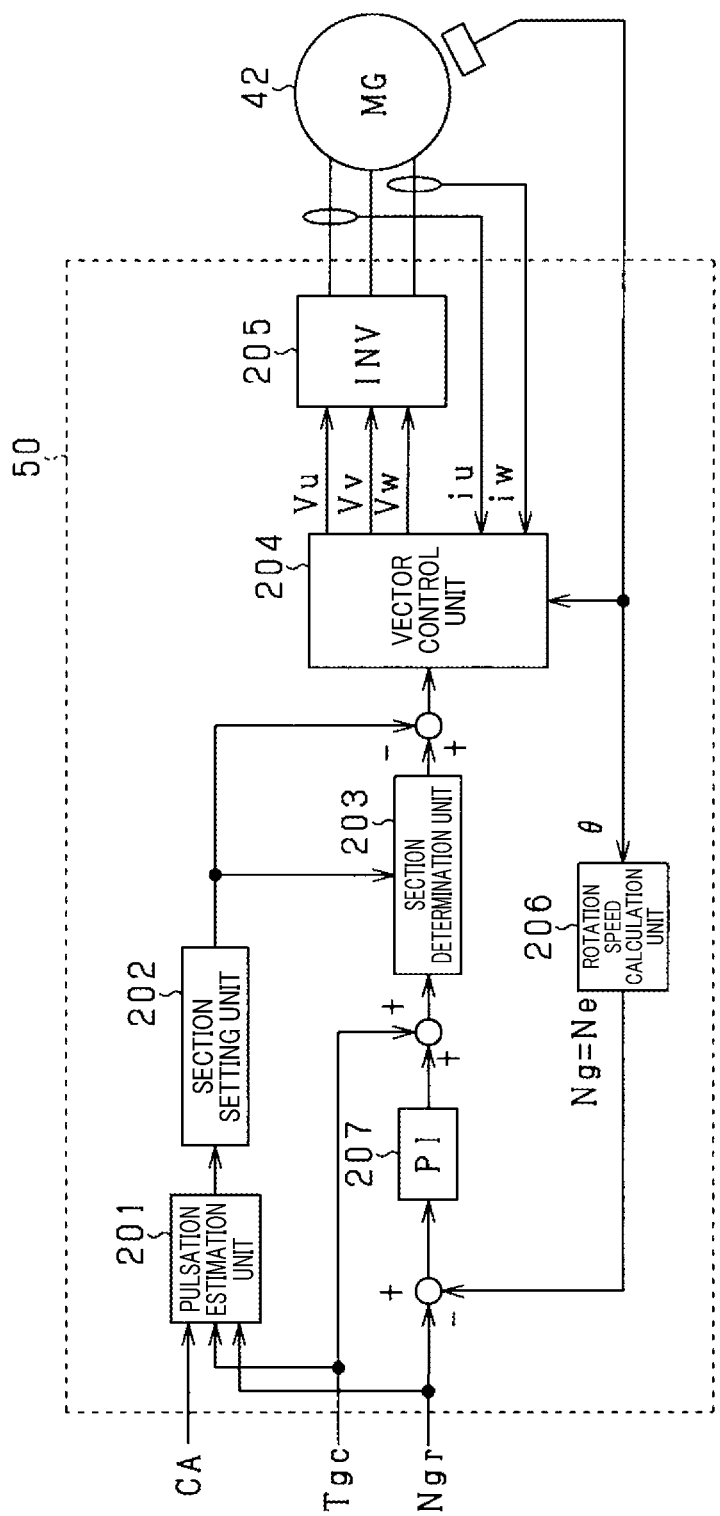
FIG. 3 is a block diagram illustrating power-generation.

FIG. 3 is a control block diagram of the motor generator 42. FIG. 3 shows an example of a case in which the motor generator 42 is a three-phase, alternating-current motor generator. The ECU 50 includes a pulsation estimation unit 201, a section setting unit 202, a section determination unit 203, a vector control unit 204, an inverter 205 that controls the motor generator 42, and a rotation speed calculation unit 206 that calculates a rotation speed of the motor generator 42.

The pulsation estimation unit 201 estimates the estimated torque pulsation of the engine 41. The crank angle CA of the engine 41, and the power generation torque command Tgc and the target rotation speed Ngr of the motor generator 42 are inputted to the pulsation estimation unit 201. The pulsation estimation unit 201 estimates the torque pulsation of the engine 41 that is read based on the inputted power generation torque command Tgc and the target rotation speed Ngr from the map stored as the torque pulsation information, as the estimated torque pulsation. The pulse estimation unit 201 provides a function as the estimation unit 52 in FIG. 1.

The section setting unit 202 sets a section in the estimated torque pulsation estimated by the pulsation estimation unit 201 in which the torque value is equal to or greater than zero as an ordinary power generation section in which the motor generator 42 is controlled by an ordinary power generation operation in which the generated power is not reduced. In addition, the section setting unit 202 sets a section in the estimated torque pulsation in which the torque value is negative as a power generation reduction period in which decrease in the rotation speed of the engine 41 is suppressed by the generated power of the motor generator 42 being reduced.

The section determination unit 203 rewrites the power generation torque command Tgc as required based on each section set by the section setting unit 202. The power generation torque command Tgc and a deviation dTg are inputted to the section determination unit 203. The deviation dTg is calculated using a proportional-integral (PI) feedback method based on the target rotation speed Ngr and the rotation speed Ng inputted to the PI control unit 207. The section determination unit 203 rewrites the inputted power generation torque command Tgc for the power generation reduction section and outputs the power generation torque command Tgc to the vector control unit 204. Specifically, the power generation torque command Tgc is rewritten to any of a power generation torque command value that is less than the power generation torque command Tgc, zero, or a drive torque command value, based on the rotation variation of the engine 41.

According to the present embodiment, the target rotation speed and an actual rotation speed of the engine 41 are equal to the target rotation speed Ngr and the actual rotation speed Ng of the motor generator 42. Therefore, as the rotation variation of the engine 41, an absolute value ($|Ng-Ngr|$) of a difference between the target rotation speed Ngr and the rotation speed Ng of the motor generator 42 can be used. The actual rotation speed Ng of the motor generator 42 calculated by the rotation speed calculation unit 206 and the target rotation speed Ngr are inputted to the section determination unit 203 through the PI control unit 207.

Information related to each section set by the section setting unit 202 and information related to the power generation torque command set by the section determination unit 203 are outputted to the vector control unit 204. In addition, detection values iu and iw of currents flowing to U- and W-phase motor windings are inputted to the vector control unit 204. The vector control unit 204 sets voltage commands of three phases (U-, V-, and W-phase voltage commands Vu, Vv, and Vw) that are used in pulse width modulation (PWM) control by performing known vector control.

The inverter 205 is a known inverter circuit that adjusts an energization current of a stator winding of each phase of the motor generator 42. For example, the inverter 205 may be configured by a full-bridge circuit that has a same number of upper and lower arms as a number of phases in the motor generator 42. Each arm is provided with a switch (such as a semiconductor switching element). Switching control of the INV 205 is performed based on the voltage commands Vu, Vv, and Vw of the three phases calculated by the vector control unit 204. The section setting unit 202, the section determination unit 203, the vector control unit 204, and the inverter 205 provide functions as the control unit 53.

Figure 4:
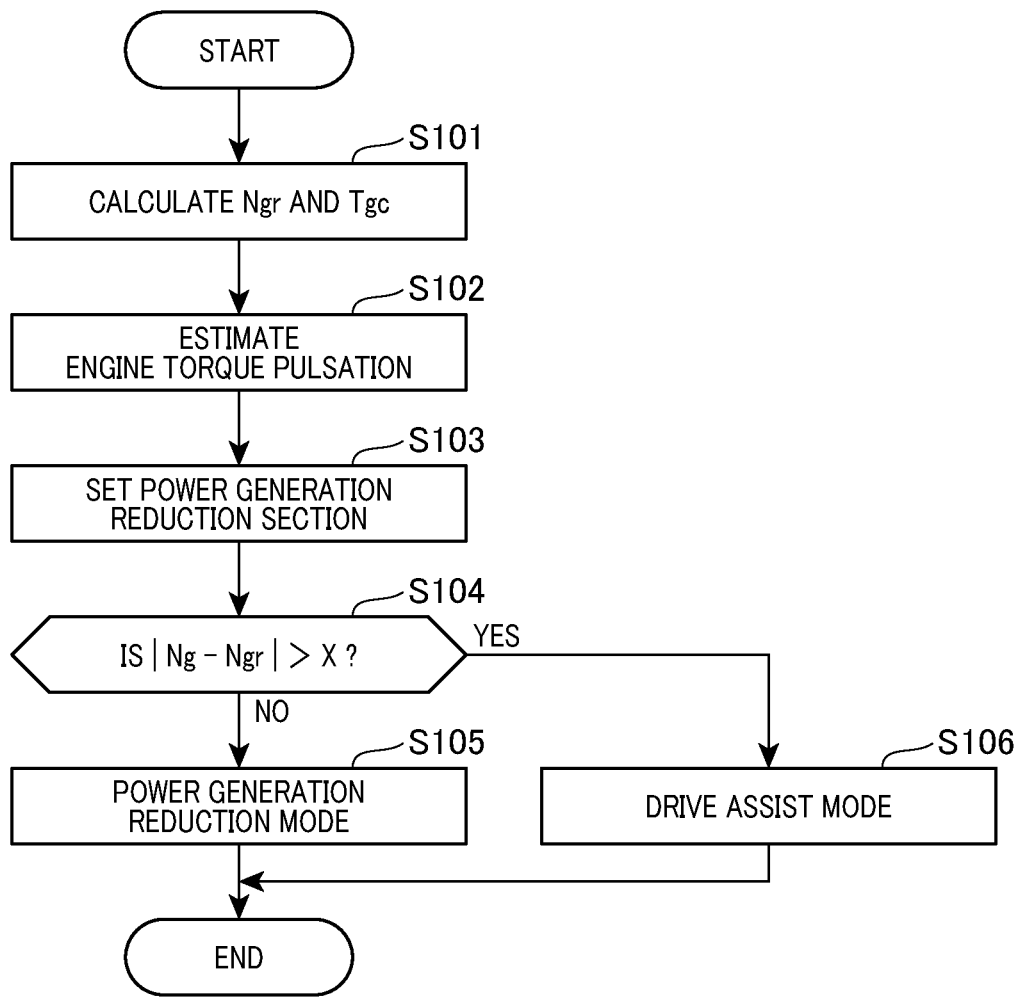
FIG. 4 is a flowchart illustrating a power generation control process performed by an electronic control unit (ECU)

FIG. 4 is a flowchart of a control process of the motor generator performed by the ECU 50. The process shown in FIG. 4 is repeatedly performed at a predetermined cycle. Here, the flowchart shown in FIG. 4 indicates the control process in a state in which a charging amount of the secondary battery 44 has no excess or insufficiency. When the charging amount of the secondary battery 44 is insufficient, regardless of the control process shown in FIG. 4, the motor generator 42 may be operated to generate power at all times. Conversely, when the secondary battery 44 is fully charged, the motor generator 42 may be stopped at all times. In addition, when a high-priority interruption process that affects vehicle failure is required, the control process shown in FIG. 4 may be stopped.

Figure 5:
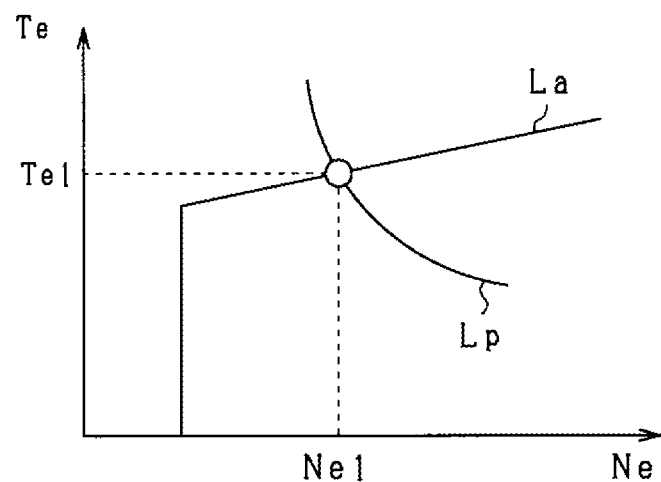
FIG. 5 is a diagram illustrating a relationship between torque and rotation speed of an internal combustion engine.

At step S101, the target rotation speed Ngr and the power generation torque command Tgc of the motor generator 42 are calculated. As shown in FIG. 5, the ECU 50 stores therein an operation line La of which parameters are the rotation speed Ne and the torque Te of the engine 41. The operation line La is indicated by a line that connects operation points at which thermal efficiency in the engine 41 is favorable, and passes near a minimum fuel consumption rate of the engine 41. The operation line La can be obtained in advance by an experiment or simulation.

The ECU 50 sets an equal power line Lp such that requested power that is requested by the vehicle is met, and determines an intersection between the operation line La and the equal power line Lp as an operation point Xp of the engine 41. Then, the ECU 50 sets a value of Ne that is an intersection between the operation point Xp and a horizontal axis as the target rotation speed Ngr, and a value of Te that is an intersection between the operation point Xp and a vertical axis as the power generation torque command Tgc. When coordinates of the operation point Xp shown in FIG. 5 are (Te1, Ne1), the target rotation speed Ngr is set to Ne1 and the power generation torque command Tgc is set to Te1.

Here, the equal power line Lp is not necessarily required to be set to cover the entirety of the power requested by the engine 41 and may be changed based on the charging amount of the secondary battery 44. For example, when the charging amount is large, the equal power line Lp may be set so as to be shifted to a low output side taking into consideration power supplied from the secondary battery 44 being supplemented. In addition, for example, when the charging amount is small, the equal power line Lp may be set so as to be shifted to a high output side taking into consideration power being supplied to the secondary battery 44. Subsequently, the process proceeds to step S102.

Figure 6:
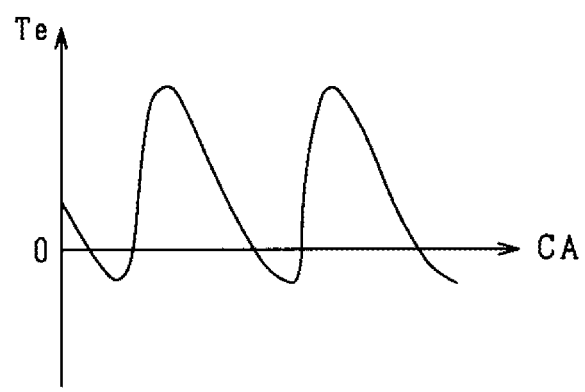
FIG. 6 is a diagram illustrating an example of crank angle/torque pulsation information.

At step S102, the estimated torque pulsation of the engine 41 is estimated based on the torque pulsation information stored in the ECU 50. The ECU 50 stores therein the torque pulsation indicating the relationship between the crank angle CA and the torque Te of the engine 41 as shown in FIG. 6 in map form for every combination of the rotation speed Ng and the torque Tg of the motor generator 42. The torque pulsation information is mapped with the rotation speed Ng and the torque Tg of the motor generator 42 as parameters. The torque pulsation such as that shown in FIG. 6 can be read by the rotation speed Ng and the torque Tg being designated.

Here, as the torque pulsation information, for example, a relationship between the crank angle CA and the torque Te of the engine 41 measured at each operation point in the onboard system 40 shown in FIG. 1 can be stored and used. Alternatively, as the torque pulsation information, that which is calculated based on inertia J of the motor generator 42 connected to the engine 41 can be used. Specifically, the torque pulsation of the engine 41 is measured in a state in which a low inertial structure is connected to the crank shaft of the engine 41, and the measured torque pulsation is set as a base torque pulsation Te(base). Then, the relationship between the crank angle CA and the torque Te at each operation point can be calculated based on the base torque pulsation Te(base) and the inertia J of the motor generator 42 attached to the engine 41.

At step S102, the torque pulsation such as that shown in FIG. 6 is read from the torque pulsation information stored in the ECU 50 based on the target rotation speed Ngr and the power generation torque command Tgc of the motor generator 42 calculated at step S101, and the torque pulsation is set as the estimated torque pulsation. Subsequently, the process proceeds to step S103.

At step S103, a section in which the torque Te of the engine 41 is negative is extracted from the read estimated torque pulsation. Specifically, a section in which Te<0 in FIG. 6 is extracted. Then, regarding the extracted Te<0 section, an assist torque Tga of the motor generator 42 is calculated. The assist torque Tga can be calculated as a reverse-phase torque of the torque Te of the engine 41 in the Te<0 section. At step S103, a section in which the assist torque Tga is a positive value is further set as the power generation reduction section in which decrease in the rotation speed of the engine 41 is suppressed by the generated power being reduced in the motor generator 42. A section in which the assist torque Tga is equal to or less than zero is set as the ordinary power generation section. Here, the ordinary power generation section and the generated power reduction section are sectioned based on the crank angle CA of the engine 41. Subsequently, the process proceeds to step S104.

At steps S104 to S106, an operation mode of the power generation reduction section set at step S103 is selected based on the magnitude of the rotation variation of the engine 41. According to the present embodiment, as shown in FIG. 3, the rotation variation of the engine 41 is equal to the rotation variation of the motor generator 42. Therefore, the operation mode is selected based on a comparison of the absolute value (|Ng−Ngr|) of the difference between the rotation speed Ng and the target rotation speed Ngr and a predetermined threshold X.

At step S104, it is determined whether the rotation variation (|Ng−Ngr|) exceeds the predetermined threshold X. When the predetermined threshold X is exceeded (when |Ng−Ngr|>X), the process proceeds to step S105. A power generation reduction mode is selected and the process is ended. When the predetermined threshold X is not exceeded (when |Ng−Ngr|≤X), the process proceeds to step S106. A drive assist mode is selected and the process is ended. Here, for example, the threshold X can be set to a value (such as about 300 rpm) at which a user of the motor generator 42 feels the rotation variation in the engine 41.

In the power generation reduction mode indicated at step S105, the power generation amount of the motor generator 42 is reduced in the power generation reduction section set at step S103. Specifically, the motor generator 42 is operated at a torque that is lower than the power generation torque command Tgc or the motor generator 42 is stopped. As a result, the generated power of the motor generator 42 is less than that when power is generated at the power generation torque command Tgc, and decrease in the rotation speed of the engine 41 can be suppressed. In the ordinary power generation section, the motor generator 42 is operated based on the power generation torque command Tgc.

Figure 7:
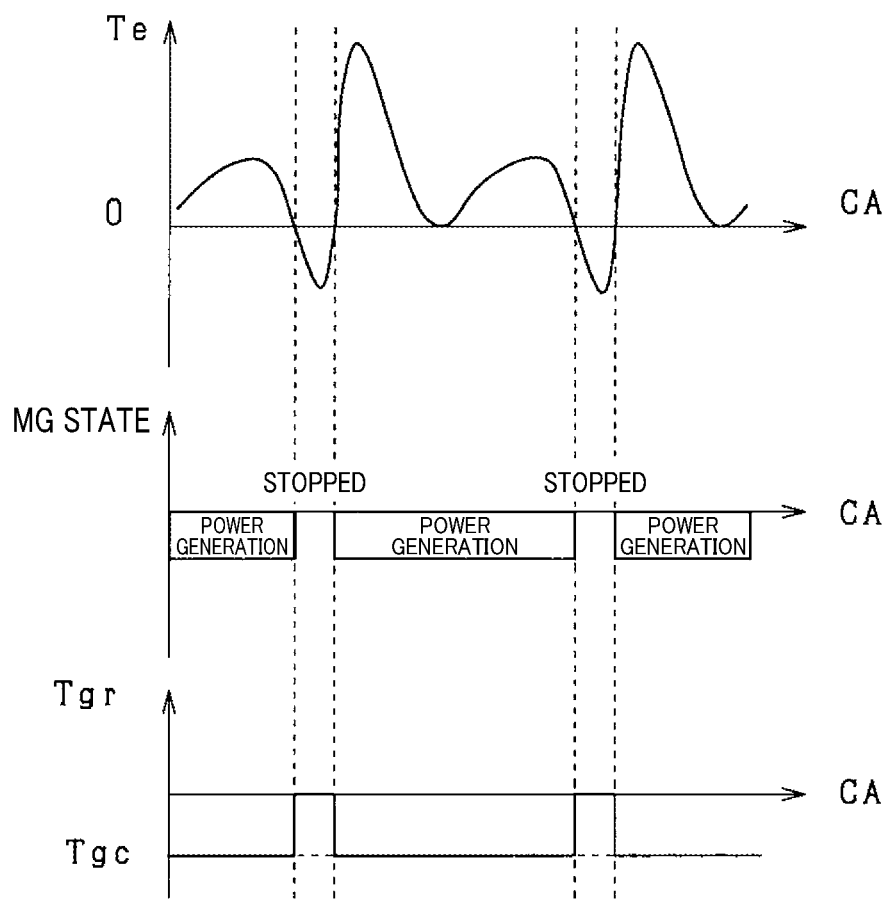
FIG. 7 is a timing chart illustrating the execution of power generation reduction mode.

FIG. 7 shows a timing chart of when control to stop the motor generator 42 is performed in the power generation reduction section in the power generation reduction mode, on a same time axis. In FIG. 7, a horizontal axis indicates the crank angle of the engine 41 and vertical axes indicate, in order from the top, the torque value based on the estimated torque pulsation of the engine 41, the operation state of the motor generator 42, and the target torque value of the motor generator 42.

As shown in FIG. 7, the section in which the torque Te of the engine 41 is Te≥0 corresponds to the ordinary power generation section of the motor generator 42. The target torque Tgr is set to the power generation torque command Tgc and the power generation operation of the motor generator 42 is performed (Tgr=Tgc). The section in which Te<0 corresponds to the power generation reduction section of the motor generator 42 and operation of the motor generator 42 is stopped (Tgr=0). In the power generation reduction section, as a result of the power generation amount of the motor generator 42 being controlled to zero, decrease in the rotation speed of the engine 41 can be suppressed by the power generation operation. Therefore, the torque pulsation in the engine 41 can be mitigated.

Here, in the power generation reduction mode, when the power generation amount of the motor generator 42 is reduced and the power generation operation is performed in the power generation reduction section, the target torque Tgr of the motor generator 42 can be set as appropriate to a value in which the torque amount is less than the power generation torque command Tgc. For example, the target torque Tgr may be set to half the power generation torque command (Tgr=Tgc/2). In addition, the torque amount of the target torque Tgr may be set to be small such that the power generation amount of the motor generator 42 decreases as the rotation variation in the engine 41 increases.

In the drive assist mode indicated at step S106, the motor generator 42 is driven as a motor and performs the drive assist operation to assist in driving of the engine 41 in the power generation reduction section set at step S103. Upon resolution of the decrease in the rotation speed of the engine 41 by the power generation operation, a positive torque is applied to the engine 41 by the motor generator 42 being driven as a motor, and decrease in the rotation speed of the engine 41 can be more effectively suppressed. In the ordinary power generation section, the motor generator 42 is operated based on the power generation torque command Tgc.

Figure 8:
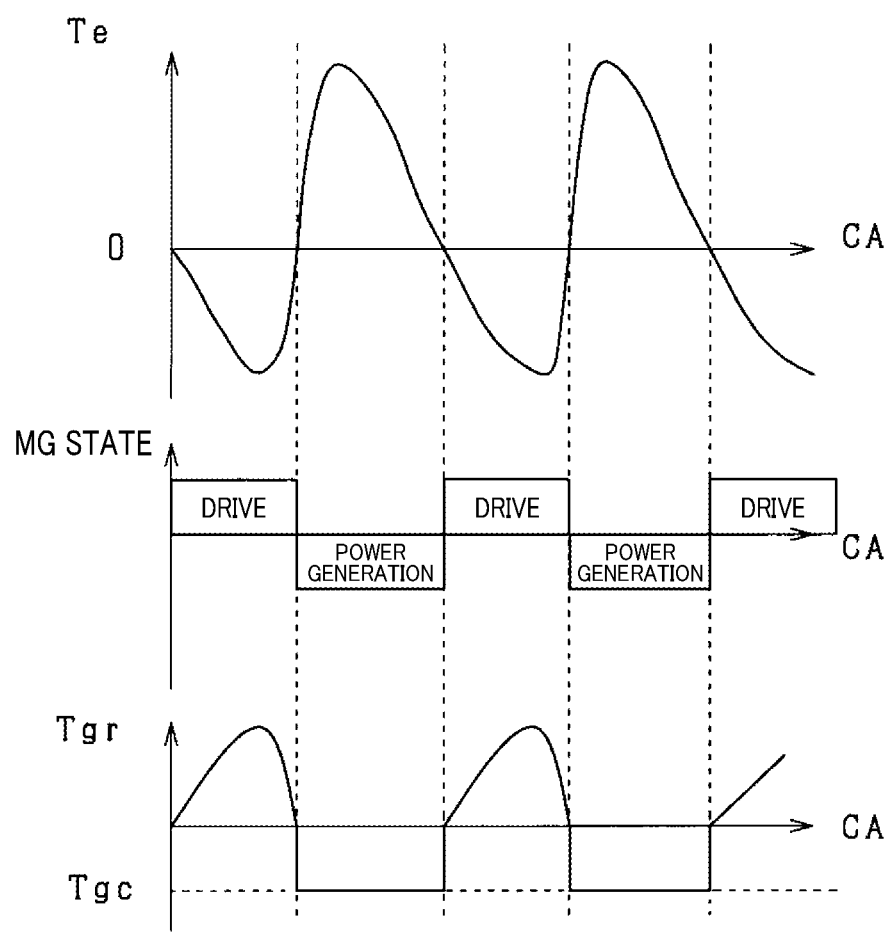
FIG. 8 is a timing chart illustrating the execution of drive assist mode.

FIG. 8 shows a timing chart in the drive assist mode on the same time axis. In FIG. 8, the horizontal axis and the vertical axes are similar to those in FIG. 7. Therefore, description thereof is omitted.

As shown in FIG. 8, the section in which the torque Te of the engine 41 is Te≥0 corresponds to the ordinary power generation section of the motor generator 42. The target torque Tgr is set to the power generation torque command Tgc and the power generation operation of the motor generator 42 is performed. The section in which Te<0 corresponds to the power generation reduction section of the motor generator 42 and drive assist operation of the motor generator 42 is performed. In the power generation reduction section, the target torque Tgr of the motor generator 42 changes in reverse phase relative to the torque of the engine 41 so as to cancel out the changes in the torque Te in the engine 41.

As shown in FIG. 8, in the drive assist mode, the drive assist operation of the motor generator 42 is performed in the power generation reduction section. As a result, the torque pulsation in the engine 41 can be more effectively mitigated than in the power generation reduction mode. In addition, as a result of the target torque Tgr of the motor generator 42 being changed in reverse phase relative to the torque of the engine 41, the drive assist amount of the motor generator 42 can be appropriated for the mitigation of negative torque in the engine 41 in a state in which there is substantially no excess or insufficiency.

Here, as shown in FIG. 7 and FIG. 8, in the ordinary power generation section, the motor generator 42 is operated with the target torque Tgr of the motor generator 42 as a fixed value. As a result of control being performed in this manner, sudden changes in generated power can be suppressed, and estimation of a power generation amount and calculation of the charging amount to the secondary battery 44 can be simplified. Meanwhile, in the ordinary power generation section as well, the configuration may be such that the target torque Tgr of the motor generator 42 is changed rather than being a fixed value.

As described above, according to the present embodiment, the ECU 50 estimates the estimated torque pulsation of the engine 41 as indicated at step S102 by the estimation unit 52. Then, when a negative torque is generated in the estimated torque pulsation of the engine 41, the section is set as the power generation reduction section of the motor generator 42 and the motor generator 42 is controlled by the control unit 53 such that decrease in the rotation speed of the internal combustion engine is suppressed by the generated power being reduced, as indicated at steps S103 to S106.

More specifically, in the power generation reduction section, the motor generator 42 is operably controlled in either of the power generation reduction mode in which the power generation amount is reduced or set to zero and the drive assist mode in which the motor generator 42 assists driving as a motor. The drive assist mode is selected when the rotation variation of the engine 41 is great and the decrease in the rotation speed of the engine 41 is effectively suppressed. Meanwhile, when the rotation variation of the engine 41 is small, the power generation reduction mode is selected and the decrease in the rotation speed of the engine 41 is suppressed while the decrease in power generation efficiency of the motor generator 42 is suppressed.

Therefore, compared to technology in which the drive assist operation is performed at all times when the negative torque is generated in the estimated torque pulsation of the engine 41, the decrease in power generation efficiency in the motor generator 42 as a result of the drive assist operation can be suppressed.

As a result of the ECU 50, the torque pulsation in the engine 41 can be mitigated while decrease in power generation efficiency in the motor generator 42 is suppressed. Therefore, contribution can be made to simplification of a configuration for damping the motor generator and for noise. For example, the ECU 50 can be particularly favorably used as the control apparatus of a motor generator that does not include a flywheel and is connected to an internal combustion engine by the shaft 12 and the rotor 30 being connected to each other without a flywheel, a gear, or a damper being provided therebetween as in the motor generator 10 shown in FIG. 2. Meanwhile, the ECU 50 can also be used as a control apparatus of a motor generator that is connected to an internal combustion engine with a flywheel, a gear, or a damper therebetween, and can achieve the effect of suppressing decrease in power generation efficiency in the motor generator 42 that may occur to mitigate torque pulsation in the engine 41.

According to the embodiments described above, following effects can be achieved.

The ECU 50 provides a function as a control apparatus of a motor generator (MG 42) that is connected to an internal combustion engine (engine 41). The ECU 50 includes the estimation unit 52 and the control unit 53. The estimation unit 52 estimates the estimated torque pulsation that is the estimation value of the torque pulsation of the engine 41. The control unit 53 controls the motor generator 42 to reduce generated power and suppress decrease in the rotation speed of the engine 41 when a negative torque that obstructs the rotation of the engine 41 is generated in the estimated torque pulsation of the engine 41.

As a result of the ECU 50, the torque pulsation in the internal combustion engine can be mitigated through reduction of generated power such that the drive assist operation is not performed when unnecessary, without the drive assist operation being performed at all times when the estimated torque pulsation of the engine 41 is a negative value. As a result, decrease in power generation efficiency in the motor generator 42 that may occur to mitigate the torque pulsation in the engine 41 can be suppressed.

The ECU includes the storage unit 51 that stores therein the torque pulsation that indicates changes in torque relative to the crank angle of the engine 41 as the torque pulsation information, in association with the rotation speed and the torque of the motor generator 42. In addition, the estimation unit 52 estimates the torque pulsation of the engine 41 that is read from the torque pulsation information based on the power generation torque command Tgc and the target rotation speed Ngr of the motor generator 42 as the estimated torque pulsation of the engine 41.

The control unit 53 performs the drive assist operation in which the motor generator 42 is driven as a motor to assist in driving of the ENG when the negative torque is generated in the estimated torque pulsation of the engine 41, when the rotation variation of the engine 41 is equal to or greater than a predetermined threshold. When the rotation variation of the engine 41 is great, the drive assist mode is selected and decrease in the rotation speed of the engine 41 is effectively suppressed. Therefore, the torque pulsation can be effectively suppressed.

The control unit 53 changes the drive assist amount of the motor generator 42 based on the changes in torque in the engine 41 during the drive assist operation. The negative torque pulsation of the engine 41 can be appropriately mitigated and decrease in power generation efficiency in the motor generator 42 can be suppressed.

The control unit 53 controls the motor generator 42 with the power generation torque command as a fixed value during the power generation operation in which the motor generator 42 is driven as a power generator. As a result of sudden changes in generated power being suppressed, estimation of the power generation amount and calculation of the charging amount to the secondary battery 44 can be simplified.

The control unit and the method thereof described in the present disclosure may be actualized by a dedicated computer that is provided so as to be configured by a processor and a memory, the processor being programmed to provide a single or a plurality of functions that are realized by a computer program. Alternatively, the control unit and the method thereof described in the present disclosure may be actualized by a dedicated computer that is provided by a processor being configured by a single or a plurality of dedicated hardware logic circuits. Alternatively, the control unit and the method thereof described in the present disclosure may be actualized by one or more dedicated computers that are configured by a combination of a processor that is programmed to provide a single or a plurality of functions, a memory, and a processor that is configured by one or more hardware logic circuits. In addition, the computer program may be stored in a non-transitory, tangible recording medium that can be read by a computer as instructions performed by the computer.

The present disclosure is applied to a control apparatus of a motor generator or a control apparatus of a motor generator that is mounted in an apparatus that is driven using power supplied from a secondary battery and, for example, may be suitable for a control apparatus of a motor generator that is mounted in a moving body such as a vehicle (including passenger-use, commercial-use, compact, two-wheeled, and traction vehicles), an aircraft, or a ship, or a stationary power generator.

The above-described moving body is capable of moving by generating propulsive force by consuming supplied power as a result of the motor generator being driven as a motor. In addition, the above-described stationary power generator is capable of charging a secondary battery with power generated by the motor generator, as well as adding the generated power and discharged power from a secondary battery and supplying the power through a power converter that converts the power from a direct current to an alternating current, and may function as a commercial power supply. The present application provides a power generation apparatus or a moving body that includes the internal combustion engine, the motor generator, and the control apparatus of the motor generator described in the above-described embodiments.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control apparatus for a motor generator that is connected to an internal combustion engine, the control apparatus comprising a processor programmed to:
   estimate an estimated torque pulsation, which is an estimation value of torque pulsation of the internal combustion engine;
   control the motor generator to suppress a decrease in a rotation speed of the internal combustion engine, when a negative torque that obstructs rotation of the internal combustion engine is generated in the estimated torque pulsation of the internal combustion engine;
   drive the motor generator as a power generator, based on a power generation torque command of the motor generator, when a positive torque in an opposite direction to the negative torque is generated in the estimated torque pulsation of the internal combustion engine;
   when (i) the negative torque is generated in the estimated torque pulsation of the internal combustion engine and (ii) rotation variation of the internal combustion engine is greater than a predetermined threshold, suppress the decrease in the rotation speed of the internal combustion engine by performing a drive assist operation in which the motor generator is driven as a motor to assist in driving of the internal combustion engine; and
   when (i) the negative torque is generated in the estimated torque pulsation of the internal combustion engine and (ii) the rotation variation of the internal combustion engine is equal to or less than the predetermined threshold, suppress the decrease in the rotation speed of the internal combustion engine by driving the motor generator as a power generator but such that power generated by the motor generator is reduced compared to when the motor generator is driven as the power generator based on the power generation torque command.

2. The control apparatus for a motor generator according to claim 1, comprising:
a memory that stores therein torque pulsation information, which indicates changes in torque relative to a crank angle of the internal combustion engine, in association with a rotation speed and a torque of the motor generator, wherein
processor is programmed to estimate the estimated torque pulsation of the internal combustion engine, which is read from the torque pulsation information, based on the power generation torque command and a target rotation speed of the motor generator.

3. The control apparatus for a motor generator according to claim 2, wherein:
the processor is programmed to change a drive assist amount of the motor generator based on changes in torque in the internal combustion engine during the drive assist operation.

4. The control apparatus for a motor generator according to claim 3, wherein:
the processor is programmed to control the motor generator with the power generation torque command as a fixed value during a power generation operation in which the motor generator is driven as the power generator.

5. The control apparatus for a motor generator according to claim 2, wherein:
the processor is programmed to control the motor generator with the power generation torque command as a fixed value during a power generation operation in which the motor generator is driven as the power generator.

6. A control apparatus for a motor generator that is connected to an internal combustion engine, the control apparatus comprising a processor programmed to:
estimate an estimated torque pulsation, which is an estimation value of torque pulsation of the internal combustion engine;
control the motor generator to suppress a decrease in a rotation speed of the internal combustion engine, when a negative torque that obstructs rotation of the internal combustion engine is generated in the estimated torque pulsation of the internal combustion engine;
when (i) the negative torque is generated in the estimated torque pulsation of the internal combustion engine and (ii) rotation variation of the internal combustion engine is equal to or greater than a predetermined threshold, suppress the decrease in the rotation speed of the internal combustion engine by performing a drive assist operation in which the motor generator is driven as a motor to assist in driving of the internal combustion engine; and
when (i) the negative torque is generated in the estimated torque pulsation of the internal combustion engine and (ii) the rotation variation of the internal combustion engine is equal to or less than the predetermined threshold, suppress the decrease in the rotation speed of the internal combustion engine by stopping driving of the motor generator and setting generated power of the motor generator to zero.

7. The control apparatus for a motor generator according to claim 3, wherein:
the processor is programmed to change a drive assist amount of the motor generator based on changes in torque in the internal combustion engine during the drive assist operation.

8. The control apparatus of for a motor generator according to claim 7, wherein:
the processor is programmed to control the motor generator with a power generation torque command as a fixed value during a power generation operation in which the motor generator is driven as a power generator.

9. The control apparatus of for a motor generator according to claim 3, wherein:
the processor is programmed to control the motor generator with a power generation torque command as a fixed value during a power generation operation in which the motor generator is driven as a power generator.

10. The control apparatus for a motor generator according to claim 1, wherein:
the processor is programmed to control the motor generator with the power generation torque command as a fixed value during a power generation operation in which the motor generator is driven as the power generator.

11. A power generation apparatus comprising:
an internal combustion engine;
a motor generator that is connected to the internal combustion engine; and
a control apparatus that controls the motor generator,
the control apparatus comprising a processor programmed to:
estimate an estimated torque pulsation, which is an estimation value of torque pulsation of the internal combustion engine;
control the motor generator to suppress a decrease in a rotation speed of the internal combustion engine, when a negative torque that obstructs rotation of the internal combustion engine is generated in the estimated torque pulsation of the internal combustion engine;
drive the motor generator as a power generator, based on a power generation torque command of the motor generator, when a positive torque in an opposite direction to the negative torque is generated in the estimated torque pulsation of the internal combustion engine;
when (i) the negative torque is generated in the estimated torque pulsation of the internal combustion engine and (ii) rotation variation of the internal combustion engine is greater than a predetermined threshold, suppress the decrease in the rotation speed of the internal combustion engine by performing a drive assist operation in which the motor generator is driven as a motor to assist in driving of the internal combustion engine; and
when (i) the negative torque is generated in the estimated torque pulsation of the internal combustion engine and (ii) the rotation variation of the internal combustion engine is equal to or less than the predetermined threshold, suppress the decrease in the rotation speed of the internal combustion engine by driving the motor generator as a power generator but such that power generated by the motor generator is reduced compared to when the motor generator is driven as the power generator based on the power generation torque command.

12. A moving body comprising:

an internal combustion engine;

a motor generator that is connected to the internal combustion engine; and a control apparatus that controls the motor generator, the control apparatus comprising a processor programmed to:

estimate an estimated torque pulsation, which is an estimation value of torque pulsation of the internal combustion engine;

control the motor generator to suppress a decrease in a rotation speed of the internal combustion engine, when a negative torque that obstructs rotation of the internal combustion engine is generated in the estimated torque pulsation of the internal combustion engine;

drive the motor generator as a power generator, based on a power generation torque command of the motor generator, when a positive torque in an opposite direction to the negative torque is generated in the estimated torque pulsation of the internal combustion engine;

when (i) the negative torque is generated in the estimated torque pulsation of the internal combustion engine and (ii) rotation variation of the internal combustion engine is greater than a predetermined threshold, suppress the decrease in the rotation speed of the internal combustion engine by performing a drive assist operation in which the motor generator is driven as a motor to assist in driving of the internal combustion engine; and when (i) the negative torque is generated in the estimated torque pulsation of the internal combustion engine and (ii) the rotation variation of the internal combustion engine is equal to or less than the predetermined threshold, suppress the decrease in the rotation speed of the internal combustion engine by driving the motor generator as a power generator but such that power generated by the motor generator is reduced compared to when the motor generator is driven as the power generator based on the power generation torque command.

\* \* \* \* \*